United States Patent
Lowe et al.

[15] 3,698,429
[45] Oct. 17, 1972

[54] GAS TIGHT ISOLATORS AND VALVES

[72] Inventors: Walter Max Lowe; Frederick Squirrell, both of London, England

[73] Assignee: Thermo-Technical Development Limited, London, England

[22] Filed: Feb. 1, 1971

[21] Appl. No.: 111,542

[30] Foreign Application Priority Data

Feb. 6, 1970  Great Britain............5,918/70
March 18, 1970  Great Britain..........12,919/70

[52] U.S. Cl. ..................137/601, 251/174, 251/307
[51] Int. Cl. ..............................................F16k 11/14
[58] Field of Search .......137/601; 251/174, 176, 307

[56] References Cited

UNITED STATES PATENTS

| | | | |
|---|---|---|---|
| 2,835,468 | 5/1958 | Sparks | 251/176 X |
| 973,606 | 10/1910 | Worley | 251/176 X |
| 2,732,170 | 1/1956 | Shand | 251/174 X |
| 3,377,047 | 4/1968 | Scholl | 251/176 X |
| 3,044,387 | 7/1962 | Hinden | 127/601 X |

Primary Examiner—Harold W. Weakley
Attorney—Irving M. Weiner

[57] ABSTRACT

A cantilever seal for an isolator or valve comprises a cantilever leaf spring and a bias spring acting on the leaf spring to tension the leaf spring when in a free position, the bias spring being itself tensioned to press the leaf spring against a seating when the seal is in a sealing position. An isolating valve for a flue or duct is provided with two sets of flexible cantilever leaf springs facing in opposite directions of the duct, the cantilever leaf springs forming a pair of opposed co-operating seals when the duct is closed; these cantilever leaf springs may be provided with bias springs arranged to act thereon as described above. Preferably the bias spring or springs cause the leaf spring to have a curved cross section in the free position, and the leaf spring is flat in the sealing position.

10 Claims, 17 Drawing Figures

INVENTOR
WALTER MAX LOWE
BY ET AL
ATTORNEY

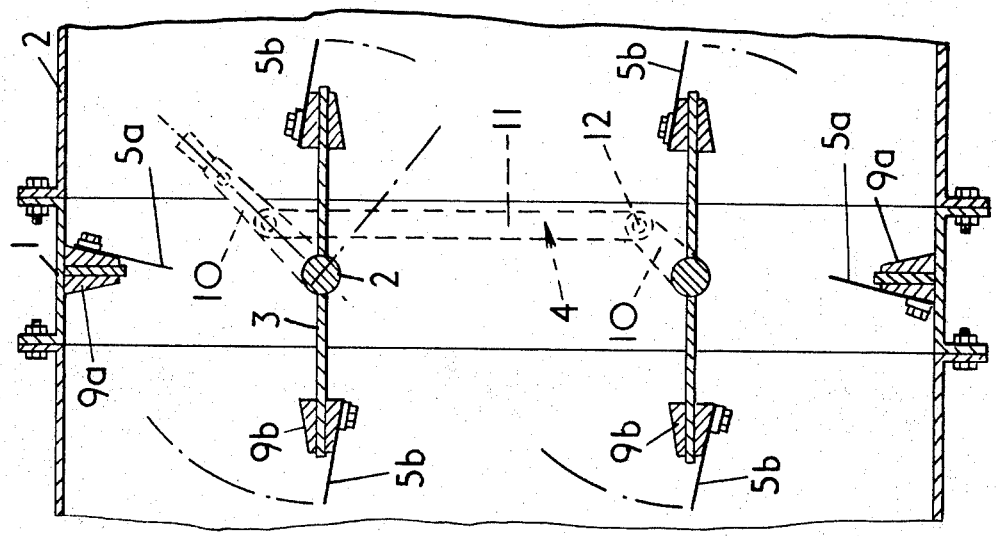

GAS TIGHT ISOLATORS AND VALVES

The invention relates to seals in gas isolators and valves, for use in ducts and flues.

The invention is particularly applicable to an isolator of the louver type, in which a movable member pivots on hinges or a spindle to open and close the duct, and to a sliding type isolator in which a movable member slides across the duct, in a direction inclined or perpendicular to the duct axis.

It is known to achieve a relatively gas-tight seal between the movable member and the fixed parts of an isolator by utilizing seals in the form of cantilever spring strips. These seals comprise planar strips of spring-tempered sheet metal, one longitudinal margin of which is secured either to the movable member or to the frame. The other, free, margin abuts in the closed position of the isolator against a flat seating on the frame or movable member, respectively. By being pressed against the seating, the sealing strip is bent and thereby tensioned, said free margin thus forming a seal against said seating.

While isolators utilizing such a sealing system give a sufficiently tight seal in conditions that are not too demanding, they do have certain important shortcomings which prohibit their use in many other applications. For example, the sealing strips can only be used in straight lengths and it is usually necessary to effect sealing along adjoining sides of a duct, which involves the sealing of corners, usually of 90°. Both tensioned sealing strips meeting at a corner are curved, and the curved strips do not abut against each other. It is apparent therefore that the strips even when overlapping at the corners, still leave gaps, which precludes the use of such seals where obnoxious, poisonous or explosive gases are to be contained, or where the pressure differential across the isolator is considerable.

A further disadvantage is that in the open position of the isolator, the sealing strips can be exposed to gas flow of high velocity, which tends to make the strips flutter or vibrate, causing damage to the strips due to metal fatigue.

There are also many uses for isolators of this type which are subject to gas flows and pressure gradients which may reverse their direction from time to time. If the direction of flow is reversed and the sealing tension of flexible sealing strips is overcome, then the sealing strips tend to be lifted from their seatings. This is the case for example in certain cyclical processes, and in applications in which an isolator is used for the protection of ships crews or personnel of land-based installations against the effects of explosions. In such instances, the explosion pressure wave is followed by a suction wave, producing a considerable pressure reversal across the isolator. The known cantilever seals can be permanently damaged when subjected to such conditions. Furthermore, rubber and other elastic seals are frequently deformed if used for such applications, and moreover they harden with age and other effects and have thus proved unsatisfactory in many cases.

It is an object of the present invention to provide isolators or valves incorporating cantilever-type seals which can overcome the above-mentioned drawbacks and thereby widen the field of use for this type of isolating equipment.

The present invention consists in a cantilever seal for an isolator or a valve comprising a cantilever leaf spring and resilient means acting on said leaf spring to tension the leaf spring when in a free position, the resilient means being itself tensioned to press the leaf spring against a seating when the seal is in a sealing position. Preferably the resilient means comprises one or more bias springs.

The invention further consists in an isolator incorporating a cantilever seal as set out in the preceding paragraph.

The seal is arranged so that the bias springs curve the leaf spring, when not in its sealing position and thereby damp any vibration of the leaf spring and prevent the leaf spring from fluttering in the gas stream. On the other hand, in abutting against a seating surface to effect a seal, the leaf spring presents a substantially flat surface tensioned for sealing by the bias springs against a flat seating face. This enables any gaps which would be formed at the corners of an isolator to be eliminated.

In order to provide safe sealing isolators for operating conditions when the pressure gradient may reverse its direction from time to time the invention still further consists in an isolating valve for a flue or duct comprising a fixed member forming a framework across the duct and at least one movable member within the duct operable between an open and closed position, the valve being provided with two sets of flexible cantilever leaf springs facing in opposite directions of the duct so that sealing of the duct is achieved in the closed position by said cantilever leaf springs forming a pair of opposed co-operating seals.

If the valve is of the pivoting type, wherein the movable members comprise louvers operated by spindles, or comprise hinged closing members, then preferably one set of seals is fixed to the hole periphery of the moving members and the other set of seals is secured to the fixed member, the two sets of seals facing in opposite directions and in the closed position forming a pair of opposed co-operating seals.

In isolators of the sliding type both sets of seals are conveniently attached either to the fixed member or to the movable member. These seals are arranged so that in the closed position they are sealing in opposite directions.

When the valves, as described in any of the three preceding paragraphs, are subjected to very demanding conditions the cantilever seals are preferably provided with bias springs as described above in order to prevent the formation of corner gaps and to increase the sealing pressure when the cantilever seals are pressed against their seatings.

The invention will be further described, by way of example only, with reference to the accompanying drawings, in which:

FIG. 7 is a cross-section of an alternative multi-louver isolator according to the invention in a closed position;

FIG. 8 is the isolator of FIG. 7 shown in the open position;

Referring to FIGS. 1 to 4 of the drawings, mounted in a flue 1 are a pair of spaced transverse shafts 2, supporting louver members 3. Members 3 are operable by an operating mechanism 4 between an open position allowing free flow of gas along the flue 1 and a closed position closing the flue. The louver members 3 are shown in a partly open position in FIG. 1.

Figure 1:
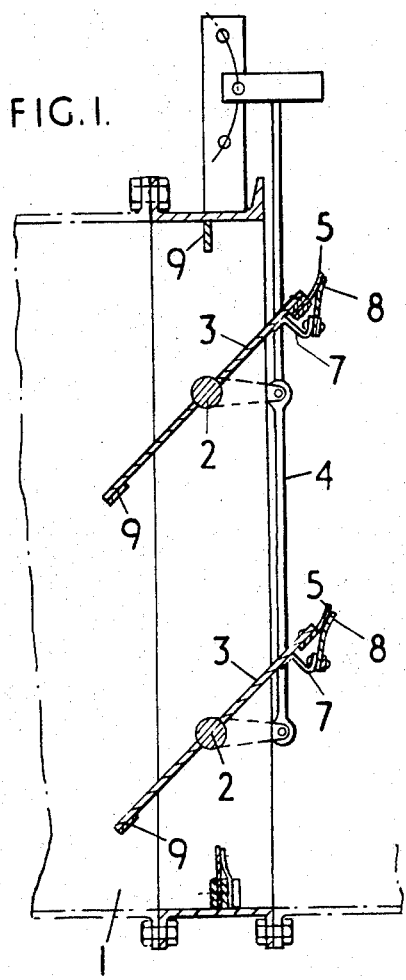
FIG. 1 is a cross-section through a flue showing a louvered damper construction according to the invention.
Figure 3:
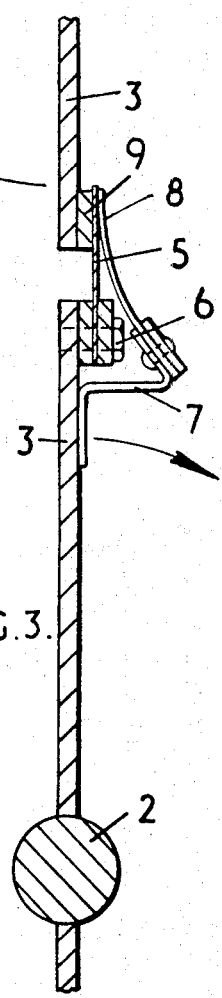
FIG. 3 is an enlarged view of part of the isolator of FIG. 1, but in a closed position.
Figure 2:
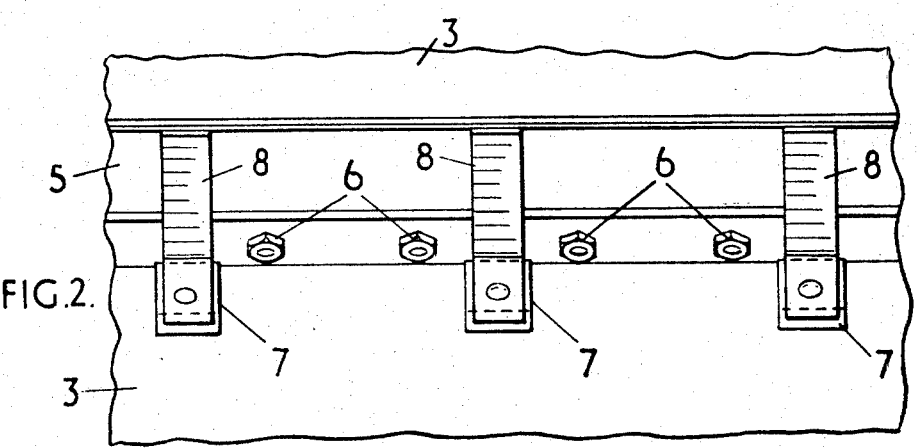
FIG. 2 is an end elevation of part of the arrangement of FIG. 1.
Figure 4:
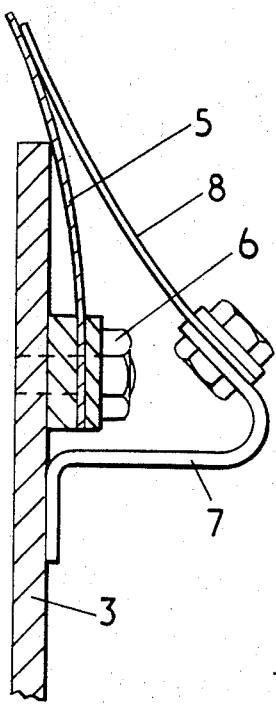
FIG. 4 is a detail of the sealing arrangement of the isolator of FIG. 1.

On the upper edge of each louver member 3 is provided a resiliently flexible cantilever leaf spring 5 made of alloy steel and secured by bolts 6 (FIG. 3). Spaced brackets 7 are mounted on the line of bolts 6 and support auxiliary spaced cantilever bias springs 8 bearing at their tips against the leaf springs 5 to deflect them into a curve pointing towards their respective spring seatings 9.

With gas flow in either direction along the flue any vibration of the leaf springs 5 is effectively damped out by the cantilever bias springs 8. In the closed position of the isolator, the leaf springs 5 are pressed against their respective seatings 9, on a co-operating louver member or on the fixed part of the isolator as the case may be. In this way the springs 5 are pressed back against the action of the bias springs 8 until they are flat, and seal against the seatings 9.

Figure 5:
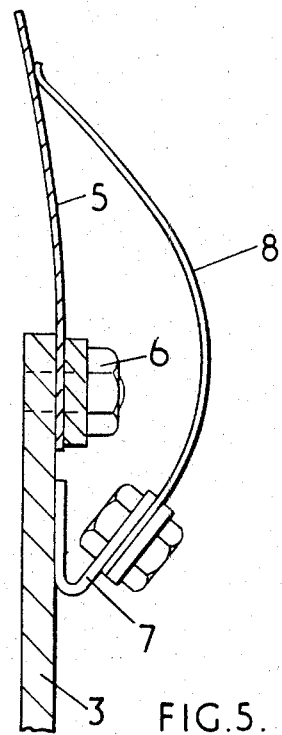
FIGS. 5 and 6 are alternative arrangements to that shown in FIG. 4.
Figure 6:
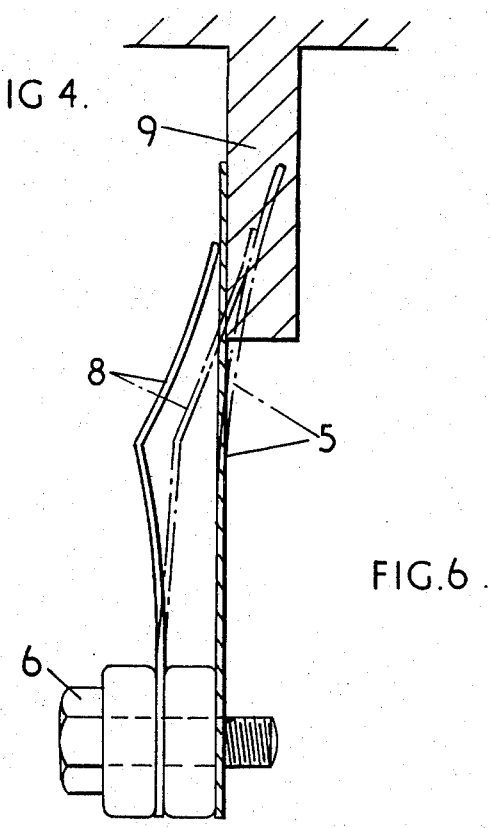

It will be readily seen that the bias springs 8, in addition to their damping effect, also reinforce the sealing action provided heretofore by the resilience of the leaf springs 5, so that the sealing effect is greatly improved in the present isolator. At the same time the bias springs also increase the resistance of the isolator seal against reverse pressure waves.

Where space limitations will permit only short bias springs, their flexibility can be increased by introducing suitable bends in their shape as seen for example in FIGS. 5 and 6. In FIG. 6 the dotted line represents the curvature the spring would have, if it were not held against the seating 9.

It is convenient from the manufacturers point of view and has been practiced heretofore, to produce the sealing springs flat, and to tension the springs for sealing by causing them to bend by abutment against a seating surface. As has been explained above, this practice means that an effective seal cannot be provided at a corner of the louver member. In the present isolator, however, the leaf springs 5 are initially curved by the bias springs and on sealing the leaf springs are flat (FIG. 4) but pressed against their flat seatings by the tensioned bias springs. Being flat in their sealing position, the leaf springs 5 enable a continuous seal to be provided, since the straight edges on adjoining leaf springs can be lined up exactly, that is virtually gas-tight at the corners thus eliminating the previous residual corner leakage.

In FIGS. 7 and 8 there is shown a multi-louver isolator suitable for use in conditions where there is a reversal of gas flow or pressure differential. Reference numerals corresponding to those in FIGS. 1 to 6 have been used so that, again, the isolator is mounted in a flue 1 and comprises shafts 2 extending across the flue to rotatably support louver members 3. Members 3 are pivotable through approximately 90° between open and closed positions by means of an operating mechanism 4 comprising cranks 10. The cranks 10 are movable between their two terminal positions by a connecting rod 11 connected to the cranks by bearings 12. The connecting rod 11 may be actuated by a hand gear, or by a motor or hydraulic actuator (not shown). By this means the louver members are moved between their open and closed positions.

The internal periphery of the isolator is provided with a set of cantilever leaf springs 5a extending completely round the duct or flue cross-section, which leaf springs are fixed in position. The louver members all carry, on all their edges a full set of leaf springs 5b. The sealing leaf springs 5a and 5b are arranged so that in the closed position of the louver members 3, two leaf springs are opposed and form a double seal at all edges to be sealed. Thus at the flue periphery the sealing is effected by a leaf spring 5a and a leaf spring 5b, and at the meeting of two louver member edges by two opposed leaf springs 5b. All the leaf springs abut on a co-operating seating 9a or 9b as shown, on either the fixed part of the isolator or on the louver members.

Thus because of the double seal, a gas pressure reversal will not upset the sealing effectiveness of the leaf springs, but which ever side of the valve is subject to pressure the sealing leaf spring on that side will be effective, its sealing action being further amplified by the action of the gas pressure acting on it.

If a valve is to withstand reversed pressures of considerable magnitude, as in the case of explosion protection, the double seal is provided with additional bias springs to combine the features of the above-described embodiments.

Figure 9:
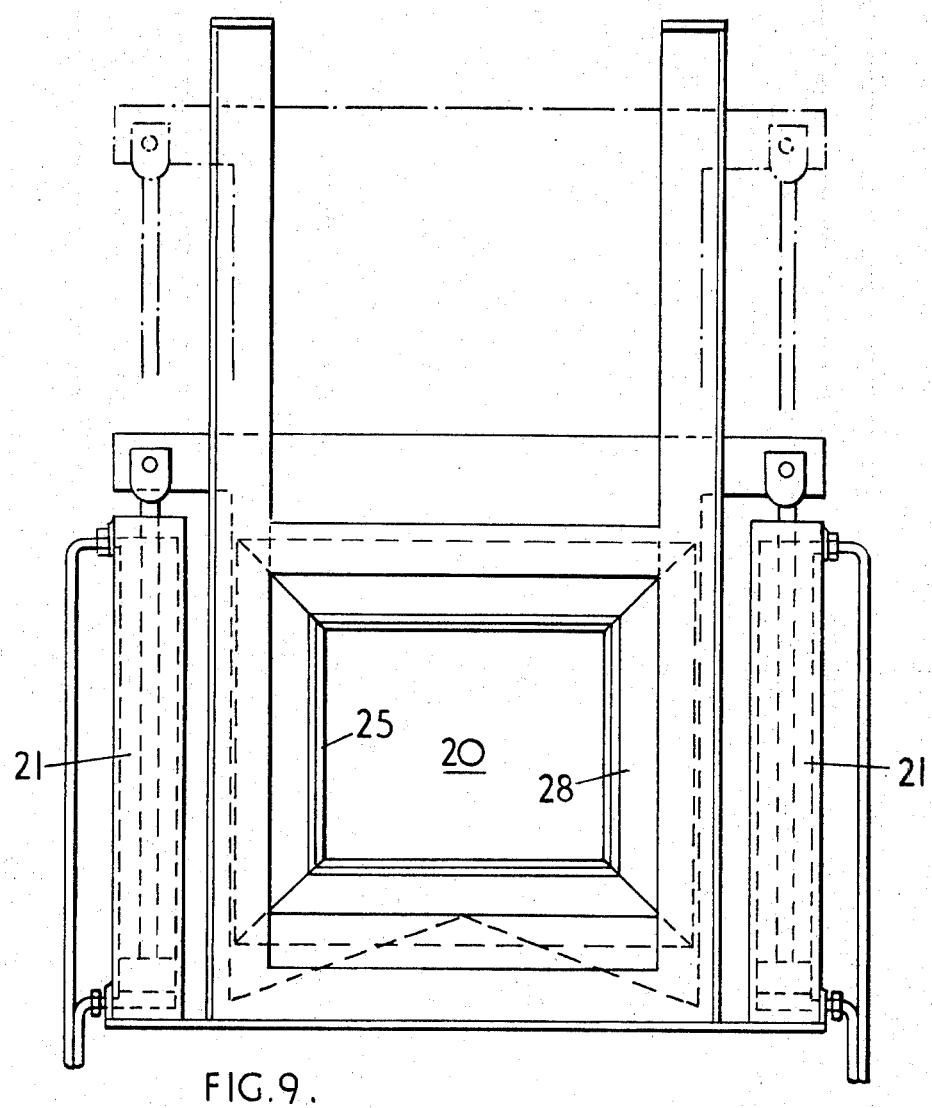
FIG. 9 is an elevation of valve for operation under reversing pressures, being of the sliding type.
Figure 10:
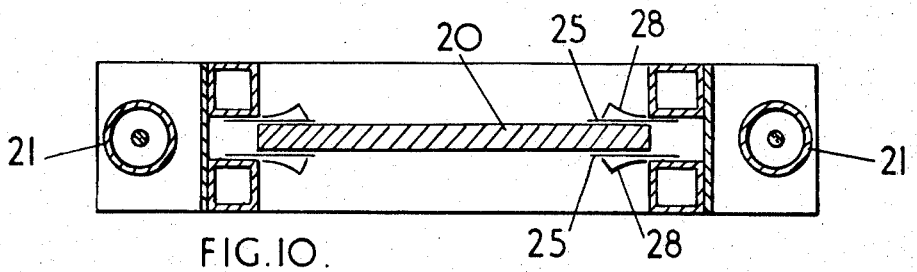
FIG. 10 is a plan view in section of the valve of FIG. 9.

The invention can also be applied to an isolator of the sliding type as shown in FIGS. 9 and 10 in which a sliding member 20 is operated between open and closed positions by two synchronized pneumatic piston-cylinder arrangements 21, with reversible action.

In the open position of the sliding member 20, the member 20 is withdrawn from the flue except for its lower edge which remains inserted in the frame of the isolator surrounding the flue.

A double seal is provided completely around the internal frame of the isolator and is fixed thereto. The seal comprises a pair of opposed leaf springs 25 reinforced by bias springs 28. The leaf springs abut against both the surfaces of the sliding member when it is in its closed position to provide a seal against pressure from either side of the member.

In FIG. 9 the sliding member 20 is shown in its closed position covering the flue cross-section but with its open, raised, position partly indicated by dotted lines.

It will be realized that in the double seal the pair of opposed leaf springs 25 tend to curve towards each other and actually do so along the bottom edge when the sliding member is withdrawn. Therefore when sliding member is moved towards its closed position with its edge situated between said leaf springs, provision has to be made to enable the member to re-enter the gap between the leaf springs 25 which gap has closed under the action of bias springs 28 to be less than the width of the member 20.

This is effected in FIGS. 9 and 10 by providing the bottom or leading edge of the sliding member with lead-in tapers which in descending will part and tension the leaf springs commencing from the sides of the isolator.

Figure 11:
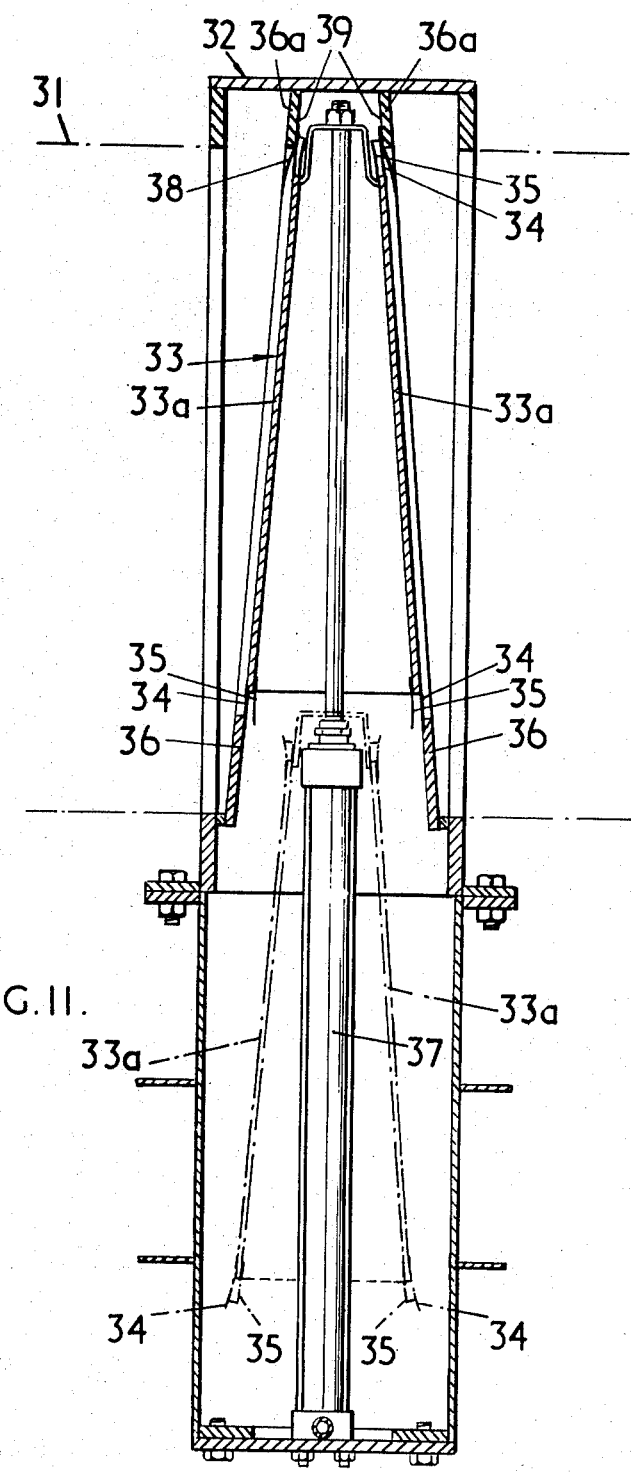
FIG. 11 is an end elevation, in section, of a sliding type of isolator according to the invention.
Figure 12:
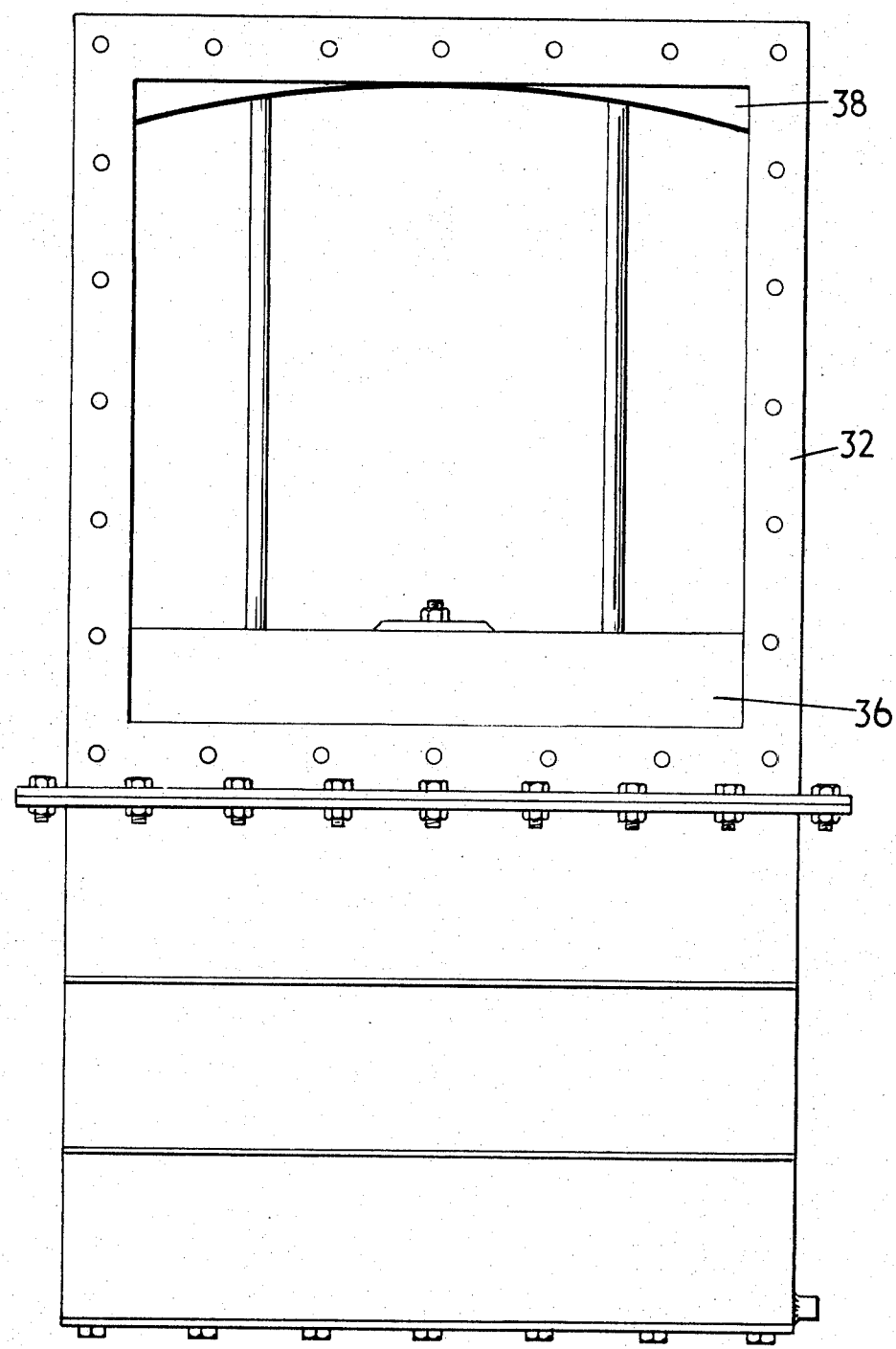
FIG. 12 is a front elevation of the isolator of FIG. 11.

FIGS. 11 and 12 show a modification of the isolator shown in FIGS. 9 and 10. In FIGS. 11 and 12, the isolator is set across a duct 31 and comprises an outer peripheral frame 32 and a sliding member 33. In FIG. 11 the sliding member is in the closed position covering the duct cross-section, and is shown dashed in its open, retracted position.

The sliding member is of hollow box construction and is tapered upwardly in side elevation as seen in FIG. 11, having two mutually inclined plane surfaces 33a. The periphery of both surfaces 33a support a continuous seal of the cantilever type as described above, in which the sealing leaf spring 34 is biased and tensioned by a plurality of auxiliary cantilever bias springs 35.

The side seals of the sliding member 33 are arranged as above.

The seals of the upper and lower edges of the sliding member engage with two pairs of abutments 36 and 36a fixed in the isolator frame, the abutments of each pair being mutually inclined as seen in FIG. 11 to correspond to the inclination of the plane surfaces 33a of the sliding member 33.

It will be realized that as the sliding member is raised by means of a piston and cylinder arrangement 37, the sliding member rapidly passes between abutments 36 until the fully closed position is almost reached. At this point the lower edge seals which are normally bent outwardly by their bias springs (FIG. 11d) engage with abutments 36 and further movement of the sliding member tensions the seals against the abutments 36 under the action of the bias springs (FIG. 11b).

Figure 11A:
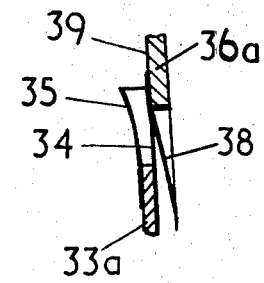
FIGS. 11a, 11b, 11c, 11d show enlarged details of FIG. 11.
Figure 11B:
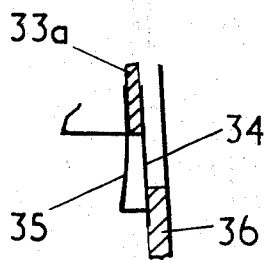
Figure 11C:
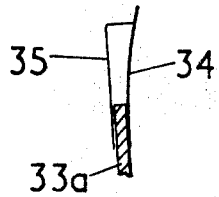
Figure 11D:
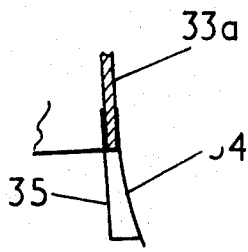

At the upper end of the sliding member the outwardly bent leaf springs 34 (FIG. 11c) initially engage with a guide member 38 of the abutments 36a, and are thereby guided to slide into engagement with the inside faces 39 of the abutments 36a (FIG. 11a). Thus a double seal is again achieved, providing protection against reversal of gas pressure to be contained by the isolator.

In the extracted position, the sliding member, can be arranged to cover the piston/cylinder arrangement 37 since the sliding member is hollow. Therefore the piston/cylinder arrangement can now be centrally disposed with respect to the sliding member and only one piston/cylinder may be required.

Since the sliding member is wedge shaped, the advantage is provided that, apart from the last few inches of movement, the seals on all sides of the sliding member remain unstressed and engage in a much more gentle manner with their respective abutments.

Figure 13:
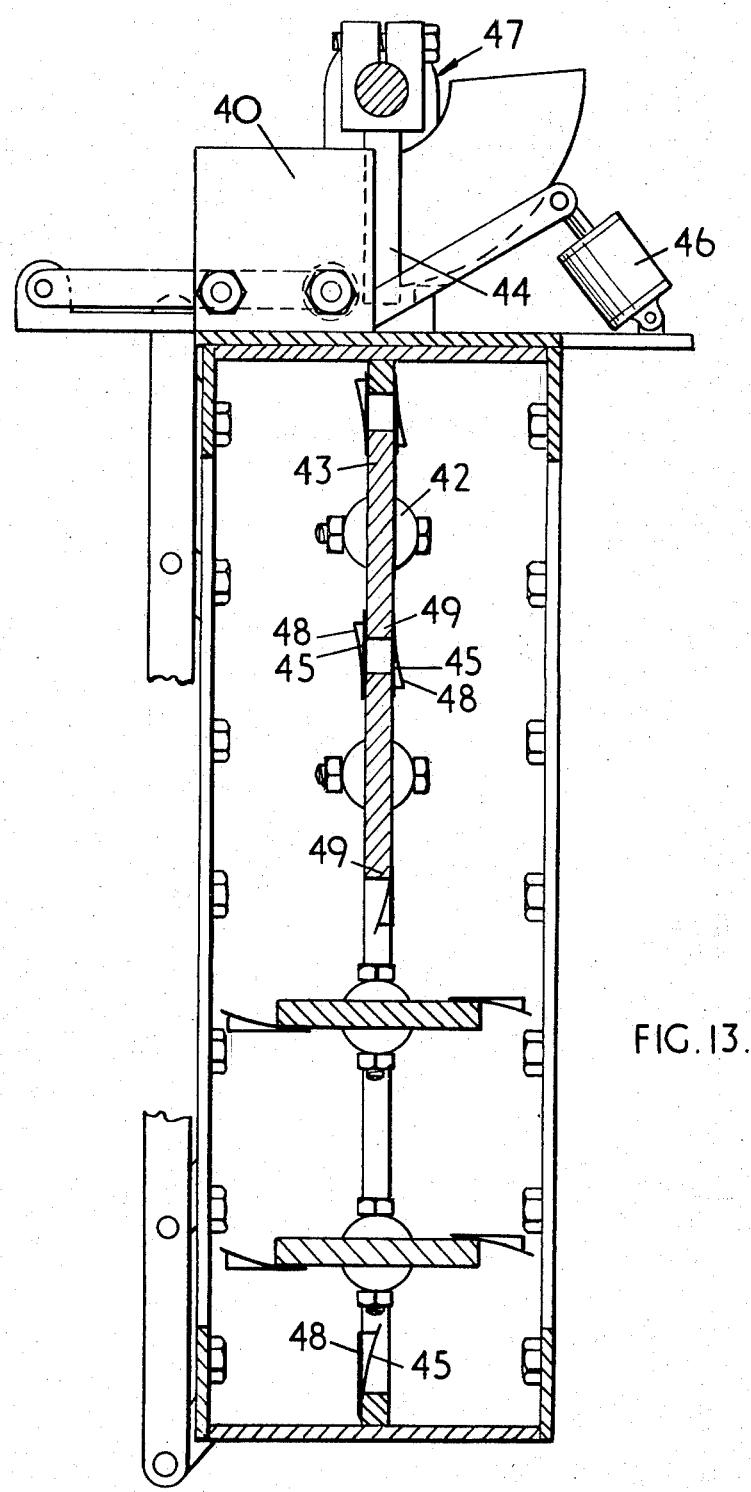
FIG. 13 is a section through a louver type explosion protection valve.

FIG. 13 shows an explosion protection valve for the same purpose as that of FIGS. 11 and 12, also provided with bias spring actuated cantilever seals arranged to seal against reversing pressures, but in the form of a multi louver type of isolator. The top half of the drawing shows the isolator in the closed position and the bottom half in the open position.

On the periphery of all the louvers, and on the corresponding parts of the frame member are secured sets of cantilever springs 45 tensioned by bias springs 48 when free. In the closed position the cantilever springs will overlap and be pressed by the bias springs against their corresponding seatings 49.

The louvers 43 are mounted on spindles 42 which are operated by linkage gear 44.

The linkage gear is pushed into its closed position by a counter weight 40 which is lifted manually to open the isolator. It is held in the open position by a catch (not shown). The catch can be withdrawn by energizing a solenoid 46. This will cause the counterweight to drop and by means of a quadrant gear 47 to close the louvers into their sealing position. This arrangement will permit several explosion protection valves to be closed simultaneously from a central remote control point.

We claim:

1. An isolator of the pivoted louver or hinged type, comprising:
   a framework having at least one fixed member disposed across a duct, at least one movable member operable between an open and closed positions, cantilever seals disposed at the margins of at least one of said members, to overlap a margin of an adjacent member when in the closed position, each of said cantilever seals comprise a cantilever leaf spring and at least one bias spring acting on said leaf spring to tension said leaf spring so as to curve said leaf spring when said movable member is in the open position, and to press said leaf spring flat against said margin of an adjacent member when said movable member is in the closed position.

2. An isolator as claimed in claim 1, wherein said cantilever seals are positioned to be biased toward a higher pressure side of said isolator.

3. An isolator of a sliding type, comprising:
   A fixed frame disposed in a duct, a movable member adapted to slide across said duct in said fixed frame in a direction transverse to a longitudinal axis of said duct, cantilever seals disposed on said fixed frame to seal against said movable member when said movable member is in a closed position in said duct, each of said cantilever seals comprise a cantilever leaf spring and at least one bias spring acting on said leaf spring to tension said leaf spring so as to curve said leaf spring when said cantilever seal is not in a sealing position, and to press said leaf spring flat against said movable member when said movable member is in said closed position across said duct.

4. An isolator of a sliding type, comprising:
   A movable member adapted to slide across a duct in a direction transverse to a longitudinal axis of said duct, cantilever seals disposed on said movable member, each of said cantilever seals comprise a cantilever leaf spring and at least one bias spring acting on said leaf spring to tension said leaf spring so as to curve said leaf spring when said seal is not in a sealing position, and at least one of said bias springs being tensioned to press said leaf spring flat against a spring seat when said seal is in said sealing position.

5. An isolating valve for a duct comprising:

A fixed member forming a framework across said duct, at least one movable member disposed within said duct operable between open and closed positions, two sets of flexible cantilever leaf springs facing in opposite directions of said duct so that sealing of said duct is achieved when said movable member is in said closed position in that said cantilever leaf springs form a pair of opposed co-operating seals, each of said cantilever leaf springs being provided with at least one bias spring acting on said leaf spring to tension said leaf spring so as to curve said leaf spring when said movable member is in said open position, and to press said leaf spring flat against a spring seat when said movable member is in said closed position.

6. An isolating valve as claimed in claim 5, wherein at least one of said movable members is arranged to pivot between said open and said closed positions.

7. An isolating valve as claimed in claim 5, wherein at least one of said movable members is a sliding member arranged to slide across said duct in a direction transverse to a longitudinal axis of said duct.

8. An isolating valve as claimed in claim 7, wherein said cantilever leaf springs are provided on opposite sides of, and at the margins of at least one of said movable members and said fixed member so as to overlap a margin of an adjacent member when in said closed position.

9. An isolating valve as claimed in claim 7, wherein a leading edge of at least one of said movable members is provided with a lead-in taper so as to guide said cantilever leaf springs to their sealing position.

10. An isolating valve as claimed in claim 7, wherein said movable member is generally wedge-shaped.

* * * * *